United States Patent
Wen et al.

(10) Patent No.: US 12,235,972 B1
(45) Date of Patent: Feb. 25, 2025

(54) SECURITY ANALYSIS METHOD AND SYSTEM BASED ON PROTOCOL STATE

(71) Applicant: HUANENG INFORMATION TECHNOLOGY CO., LTD., Shandong (CN)

(72) Inventors: Ziqiang Wen, Qingdao (CN); Hongjian Qi, Qingdao (CN); Shuo Han, Qingdao (CN); Chenghua Qu, Qingdao (CN); Yufei Wang, Qingdao (CN); Lei Xu, Qingdao (CN); Zhongying Pan, Qingdao (CN); Sheng Ye, Qingdao (CN); Shouhui Xin, Qingdao (CN); Wei Li, Qingdao (CN); Yujie Liu, Qingdao (CN); Qiang Zhang, Qingdao (CN); Chengfeng Song, Qingdao (CN); Hongwei Zhang, Qingdao (CN); Yanfei Xu, Qingdao (CN); Xushuai Qin, Qingdao (CN); Xunan Deng, Qingdao (CN)

(73) Assignee: HUANENG INFORMATION TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/767,953

(22) Filed: Jul. 9, 2024

(30) Foreign Application Priority Data

Aug. 4, 2023 (CN) .......................... 202310982685.3

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
None
See application file for complete search history.

(56) References Cited

U.S. PATENT DOCUMENTS

| 7,836,503 B2 * | 11/2010 | Tarquini .............. H04L 63/1416 |
| | | 726/25 |
| 2003/0212909 A1 * | 11/2003 | Chandrashekhar ... G06F 21/577 |
| | | 726/25 |

(Continued)

FOREIGN PATENT DOCUMENTS

| CN | 106209843 A | 12/2016 |
| CN | 107026835 A | 8/2017 |

(Continued)

OTHER PUBLICATIONS

A. Aijaz and A. H. Aghvami, "Cognitive Machine-to-Machine Communications for Internet-of-Things: A Protocol Stack Perspective," in IEEE Internet of Things Journal, vol. 2, No. 2, pp. 103-112, Apr. 2015, doi: 10.1109/JIOT.2015.2390775 (Year: 2015).*

(Continued)

*Primary Examiner* — Paul R Fisher
(74) *Attorney, Agent, or Firm* — PORUS IP LLC

(57) ABSTRACT

The disclosure provides a security analysis method and system based on protocol state, which relates to the technical field of protocol security protection. The method includes the following: a node traversal table is built, the node traversal table is scanned and analyzed according to the protocol trigger sequence rule, a first security evaluation factor of a protocol stack is determined, and a second security evaluation factor of each protocol is determined based on protocol normal application rule, and the trustworthiness degree of the second security factor is determined based on the first security factor, and the second security factor is revised based on the trustworthiness degree, and the security state of the protocol is determined according to the (Continued)

revised second security factor, thus the analysis of the protocol state is realized, and the security of the protocol can be accurately determined.

6 Claims, 1 Drawing Sheet

(56) References Cited

U.S. PATENT DOCUMENTS

| | | | | |
|---|---|---|---|---|
| 2004/0064693 | A1* | 4/2004 | Pabla | H04L 67/1076 713/168 |
| 2005/0086300 | A1* | 4/2005 | Yeager | H04L 69/329 709/204 |
| 2007/0143851 | A1* | 6/2007 | Nicodemus | H04L 63/1433 726/4 |
| 2014/0201838 | A1* | 7/2014 | Varsanyi | G06F 21/552 726/23 |
| 2016/0099963 | A1* | 4/2016 | Mahaffey | H04L 63/166 726/25 |
| 2022/0303300 | A1 | 9/2022 | Egan | |

FOREIGN PATENT DOCUMENTS

| | | | |
|---|---|---|---|
| CN | 111669375 A | 9/2020 | |
| WO | WO2017127850 A1 * | 7/2017 | ............... G06N 5/02 |
| WO | WO2018087116 A1 * | 5/2018 | ............ H04W 24/00 |
| WO | WO2023038957 A1 * | 3/2023 | ............... G06F 8/60 |

OTHER PUBLICATIONS

Ahmed, Sheeraz, Rehman, Mujeeb Ur, Ishtiaq, Atif, Khan, Sarmadullah, Ali, Armughan, Begum, Shabana, VANSec: Attack-Resistant VANET Security Algorithm in Terms of Trust Computation Error and Normalized Routing Overhead, Journal of Sensors, 2018, 6576841, 17 pages, 2018. (Year: 2018).*
Machine Translation of CN112380531A (Year: 2021).*
Zhao, Tong, Research on key Technologies of Network Threat Situation Based on Multi-source Log, Information Technology Series, 2018, 65 pages.
Decision to Grant a Patent in Chinese Application No. 202310982685.3 mailed on May 15, 2024, 7 pages.

* cited by examiner

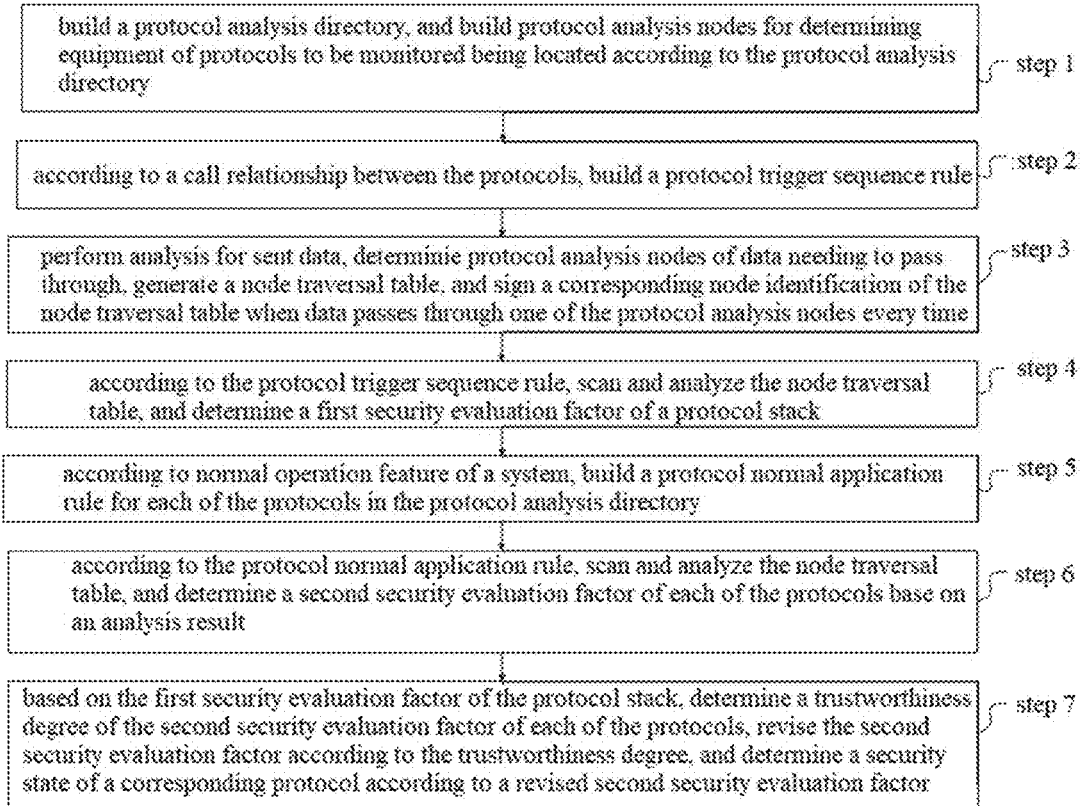

SECURITY ANALYSIS METHOD AND SYSTEM BASED ON PROTOCOL STATE

CROSS-REFERENCE TO RELATED APPLICATIONS

This application claims priority of Chinese Patent Application No. 202310982685.3, filed on Aug. 4, 2023, the contents of which is hereby incorporated by reference.

TECHNICAL FIELD

The disclosure relates to the technical field of protocol security protection, in particular to a security analysis method and system based on protocol state.

BACKGROUND

The security analysis of protocol states refers to the analysis and evaluation of various states in the protocol operation, so as to determine the security performance and guarantee degree of the protocol in different states. In the field of network security, the security analysis of protocol state is very important, because it can help network administrators and security experts identify security vulnerabilities and risks under the protocol state, so as to take corresponding security measures to protect network security.

In the prior art, the analysis method for protocol attacks is to analyze data units, and whether there is a protocol attack can be judged by judging whether the analyzed data units conform to the preset standards. However, this method has poor attack effect on those false data units with high imitation, so there is an urgent need for a method to judge the security of the protocol according to the protocol state.

SUMMARY

An object of the disclosure is to provide a method capable of judging security according to a protocol state.

Therefore, the disclosure provides a security analysis method based on protocol state, which includes the following steps:
building a protocol analysis directory, and building protocol analysis nodes for determining equipment of protocols to be monitored being located according to the protocol analysis directory;
according to a call relationship between the protocols, building a protocol trigger sequence rule;
performing analysis for sent data, determining protocol analysis nodes of data needing to pass through, generating a node traversal table, and signing a corresponding node identification of the node traversal table when data passes through one of the protocol analysis nodes every time;
according to the protocol trigger sequence rule, scanning and analyzing the node traversal table, and determining a first security evaluation factor of a protocol stack;
according to normal operation feature of a system, building a protocol normal application rule for each of the protocols in the protocol analysis directory;
according to the protocol normal application rule, scanning and analyzing the node traversal table, and determining a second security evaluation factor of each of the protocols base on an analysis result;
based on the first security evaluation factor of the protocol stack, determining a trustworthiness degree of the second security evaluation factor of each of the protocols, revising the second security evaluation factor according to the trustworthiness degree, and determining a security state of a corresponding protocol according to a revised second security evaluation factor.

In some embodiments of the disclosure, building protocol analysis nodes for determining equipment of protocols to be monitored being located according to the protocol analysis directory includes:
according to the protocol analysis directory, determining protocols to be monitored, equipment of the protocols being located and function of the protocols;
building the protocol analysis nodes according to the equipment of the protocols being located, and building a protocol monitoring model at the protocol analysis nodes according to the function of the protocols, where the protocol monitoring model is used for monitoring actions of the protocols when executing function.

In some embodiments of the disclosure, a method for building a protocol trigger sequence rule is provided, according to a call relationship between the protocols, building a protocol trigger sequence rule includes:
according to function to be executed by the system, determining all sub-working steps of each function needing to complete;
determining a protocol to be applied for all the sub-working steps, determining the protocol to be applied and a protocol calling sequence according to completion feature of completing the sub-working steps, and generating first protocol calling logics, where the sub-working steps are associated with the first protocol calling logics;
comparing and analyzing protocols needing to be monitored determined by the protocol analysis directory with all the first protocol calling logics, screening out contained protocols to be monitored for each of the first protocol calling logics, and generating second protocol calling logics according to a calling sequence of corresponding first protocol calling logics for screened protocols needing to be monitored;
constructing all the second protocol calling logics as a protocol trigger sequence rule, and the second protocol calling logics are associated with corresponding sub-working steps associated with the first protocol calling logics.

In some embodiments of the disclosure, a method for determining the first security evaluation factor of the protocol stack is provided, scanning and analyzing the node traversal table according to the protocol trigger sequence rule, and determining the first security evaluation factor of the protocol stack includes:
building a protocol stack abnormal number array for the node traversal table, where the protocol stack abnormal number array is set with a plurality of abnormal number intervals connected end to end;
scanning and analyzing the node traversal table according to the protocol trigger sequence rule, and where every time a node traversal table failing to conform to the protocol trigger sequence rule appears, determining a number of abnormal protocol stack once,
according to abnormal number interval in the protocol stack abnormal number array of protocol stack abnormal number belonging to in a preset time period, assigning a value to the first security evaluation factor.

In some embodiments of the disclosure, according to normal operation feature of a system, building a protocol normal application rule for each of the protocols in the protocol analysis directory includes:

obtaining a system running state log, and determining a plurality of system sub-running state feature contained in a normal running process of the system according to the system running state log;

according to the sub-running state feature of the system, recording different protocol calling situations at a same time node, and integrating different protocol calling situations belonging to a same running state feature of the system to generate protocol normal calling state groups;

constructing all the protocol normal calling state groups into the protocol normal application rule.

In some embodiments of the disclosure, a method for determining a second security evaluation factor of each of the protocols base on an analysis result is provided, according to the protocol normal application rule, scanning and analyzing the node traversal table, and determining a second security evaluation factor of each of the protocols base on an analysis result include:

building a first timeline for protocol triggering, setting first labels for each of the protocol analysis nodes on the node traversal table on the first timeline, and constructing all first labels belonging to a corresponding node traversal table as a first label group;

judging time interval between the first labels, determining whether the time interval between the first labels conforms to the protocol normal rule, and if the protocol normal rule is conformed, determining the first labels conforming to time interval inspection elements in the protocol normal rule once;

scanning and analyzing the first label groups corresponding to two node traversal tables adjacent to generation time node, and determining whether time interval between same first labels in two first label groups conforms to the protocol normal rule, and if the protocol normal rule is conformed, determining the first labels meeting frequency inspection elements in the protocol normal rule once;

if one of the first labels meets both the time interval inspection elements and the frequency inspection elements, determining the first labels conforming to the protocol normal application rule;

if the first labels fail to conform to meet the protocol normal application rule, determining a single protocol abnormality once;

in a preset time period, according to a number of the single protocol protocol abnormality, assigning a value to the second security evaluation factor of a single protocol.

In some embodiments of the disclosure, a method for determining a trustworthiness degree of the second security evaluation factor of each of the protocols is provided, based on the first security evaluation factor of the protocol stack, determining a trustworthiness degree of the second security evaluation factor of each of the protocols includes:

setting a first security factor corresponding value array, and where the first security factor corresponding value array includes a plurality of first security factor corresponding value intervals of being connected end to end, and each of the first security factor corresponding value intervals corresponds to a trustworthiness degree;

according to a first security factor corresponding value interval of the first security factor corresponding value belonging to, determining a trustworthiness degree of the second security factor;

In some embodiments of the disclosure, a method for determining a safety state of a second safety evaluation factor is disclosed, determining a security state of a corresponding protocol according to the revised second security evaluation factor includes:

according to the revised second security evaluation factor, determining the security state value of the corresponding protocol, and where a expression of the security state value is determined as follows:

$$Y = \frac{bn \cdot a_i \cdot \ln \sum_1^i k_i}{e^t}$$

where, Y is the security state value, bn is a corresponding value of a second security evaluation factor of n-th protocol, $a_i$ is a corresponding value of a first security evaluation factor obtained after the protocol stack conforms to the protocol trigger sequence rule for i consecutive times, $k_i$ is a correction coefficient of the first security evaluation factor for i-th time, and t is a security expression parameter.

In some embodiments of the disclosure, a security analysis system based on protocol state is provided and includes:

a protocol analysis directory input module used for inputting a protocol analysis directory;

a traversal table generation module used for generating a node traversal table according to protocol analysis nodes of data passing through;

a signature module used for signing the node traversal table according to protocol analysis nodes of data passing through;

a protocol stack security evaluation module internally provided with a protocol trigger sequence rule, and used for scanning and analyzing the node traversal table to determine a first security evaluation factor of the protocol stack;

a single protocol security evaluation module internally provided with a protocol normal application rule, and used for scanning and analyzing the node traversal table to determine a second security evaluation factor of each of the protocols;

a security state determination module, used for analyzing the first security evaluation factor of the protocol stack, determining a trustworthiness degree of the second security evaluation factor based on a analysis result, revising the second security evaluation factor according to the trustworthiness degree, and determining a security state of a corresponding one of protocols according to a revised second security evaluation factor;

The signature module is arranged in equipment of a corresponding protocol analysis node.

The disclosure provides a security analysis method and system based on protocol state, which includes the following: a node traversal table is built, the node traversal table is scanned and analyzed according to the protocol trigger sequence rule, a first security evaluation factor of a protocol stack is determined, and a second security evaluation factor of each protocol is determined based on protocol normal application rule, and the trustworthiness degree of the second security factor is determined based on the first security factor, and the second security factor is revised based on the trustworthiness degree, and the security state of the protocol is determined according to the revised second security factor, thus the analysis of the protocol state is realized, and the security of the protocol can be accurately determined.

In the following, the technical scheme of the disclosure will be further described in detail through the attached drawings and embodiments.

BRIEF DESCRIPTION OF THE DRAWINGS

FIG. 1 is a method step diagram of a security analysis method based on protocol state according to embodiments of the disclosure.

DETAILED DESCRIPTION OF THE EMBODIMENTS

In the following, the technical scheme of the disclosure will be further explained by the attached drawings and embodiments.

The technical scheme of the disclosure will be described clearly and completely with the attached drawings and specific embodiments. It should be understood that the preferred embodiments described here are only used to illustrate and explain the disclosure, and cannot be understood as limiting the protection scope of the disclosure. Those skilled in the art can make some non-essential improvements and adjustments according to the following contents of the disclosure. In the disclosure, unless otherwise specified and limited, technical terms used in this disclosure shall have their ordinary meanings as understood by the technicians in this disclosure. The terms "connected", "connection", "fixed" and "provide" should be broadly understood, which can be fixed connection, detachable connection or integrated; it can be directly connected or indirectly connected through an intermediary; it can be a mechanical connection or an electrical connection. Unless otherwise explicitly defined. For those skilled in the art, the specific meanings of the above terms in the disclosure can be understood according to specific situations. Unless otherwise specified and limited, the first feature on the second feature "above" or "below" can be the direct contact between the first and second features, or the indirect contact between the first and second features through an intermediary. Moreover, the first feature is "on" or "above" or "upper" the second feature, etc, it can mean that the first feature is directly above or obliquely above the second feature, or it just means that the horizontal height of the first feature is higher than the second feature. The first feature is "under" or "below" or "underneath" the second feature, it can mean that the first feature is directly under or obliquely under the second feature, or it just means that the horizontal height of the first feature is smaller than the second feature. Relational terms such as first, second, etc. are only used to distinguish one entity or operation from another entity or operation without necessarily requiring or implying any such actual relationship or order between these entities or operations. It should be noted that similar signs and letters indicate similar items in the following drawings, so once an item is defined in one drawing, it does not need to be further defined and explained in subsequent drawings.

EMBODIMENTS

The purpose of the disclosure is to provide a security analysis method based on protocol state, referring to FIG. 1, which includes the following steps.

Step 1, a protocol analysis directory is built, and protocol analysis nodes are built for determining equipment of protocols to be monitored being located according to the protocol analysis directory.

It should be understood that the protocol analysis directory can be a program which is formulated in advance by the staff based on the protocols to be called by the system operation, and monitors the protocol actions for the establishment of the equipment where the protocol is located, such as the actions of analyzing data by the protocol, and can be determined by the monitored program.

Step 2, according to a call relationship between the protocols, a protocol trigger sequence rule is built.

It should be understood that in the process of protocol application, there is an application sequence, such as five-layer network structure, physical layer, data link layer, network layer, transport layer and application layer, and each layer is applied with a corresponding protocol. Moreover, in the process of data transmission, the protocols used to analyze the data are also performed in sequence. Only by identifying the sequence of the used protocols and recording the identification can the node traversal table be generated. It can avoid malicious attacks from outside to send deceptive data from network nodes that do not belong to the source and then attack the system.

The protocol trigger sequence rule can include multiple sequential trigger groups, for example, a sequential trigger group can be {protocol a=1, x protocol b=2, protocol c=3}, where protocol a is the first, protocol b is the second and protocol c is the third.

Step 3, analysis is performed for sent data, protocol analysis nodes of data needing to pass through are determined, a node traversal table is generated, and a corresponding node identification of the node traversal table is signed when data passes through one of the protocol analysis nodes every time.

It should be understood that it is the program signing the corresponding node identification of the node traversal table. In view of the validity and security of the signature, a signature generation program can be set in the equipment where the protocol is located, and a signature analysis program can be set in the system.

Step 4, according to the protocol trigger sequence rule, the node traversal table is scanned and analyzed, and a first security evaluation factor of a protocol stack is determined.

It should be understood that the protocol stack can be understood as the combination of all protocols to be applied in order to execute a function of the system or a certain step under a function. The first security evaluation factor can be understood as a variable for security evaluation of the protocol stack and can be a specific value.

Step 5, according to normal operation feature of a system, a protocol normal application rule is built for each of the protocols in the protocol analysis directory.

It should be understood that the normal operation feature of the system includes the normal operation feature of the system at different time points. Under this feature, each protocol has corresponding calling feature. For example, when the system is busy at time period 7-8 o'clock, the load of the total performance resources occupied by a certain function is in a specific interval, and the realization of this function and the application frequency of the protocol needing to be called are also in a specific interval. Beyond this interval, it can be determined that the protocol appears abnormal.

Step 6, according to the protocol normal application rule, the node traversal table is scanned and analyzed, and a second security evaluation factor of each of the protocols is determined base on an analysis result.

Step 7, based on the first security evaluation factor of the protocol stack, a trustworthiness degree of the second security evaluation factor of each of the protocols is determined, the second security evaluation factor is revised according to the trustworthiness degree, and a security state of a corresponding protocol is determined according to a revised second security evaluation factor.

It should be understood that the security of the entire protocol stack is determined by the first security evaluation factor, and based on this security evaluation, it is preliminarily determined whether the system has been attacked, and based on this preliminary judgment, a more accurate judgment of the security state is realized.

In some embodiments of the disclosure, building protocol analysis nodes for determining equipment of protocols to be monitored being located according to the protocol analysis directory includes:
- step 1, according to the protocol analysis directory, protocols to be monitored, equipment of the protocols being located and function of the protocols are determined;
- step 2, the protocol analysis nodes are built according to the equipment of the protocols being located, and a protocol monitoring model is built at the protocol analysis nodes according to the function of the protocols, where the protocol monitoring model is used for monitoring actions of the protocols when executing function.

In some embodiments of the disclosure, a method for building a protocol trigger sequence rule is provided, according to a call relationship between the protocols, building a protocol trigger sequence rule includes:
- step 1, according to function to be executed by the system, all sub-working steps of each function needing to complete are determined;
- step 2, a protocol to be applied is determined for all the sub-working steps, the protocol to be applied and a protocol calling sequence are determined according to completion feature of completing the sub-working steps, and generating first protocol calling logics, where the sub-working steps are associated with the first protocol calling logics;
- step 3, protocols needing to be monitored determined by the protocol analysis directory are compared and analyzed with all the first protocol calling logics, contained protocols to be monitored are screened out for each of the first protocol calling logics, and second protocol calling logics are generated according to a calling sequence of corresponding first protocol calling logics for screened protocols needing to be monitored;
- step 4, all the second protocol calling logics are constructed as a protocol trigger sequence rule, and the second protocol calling logics are associated with corresponding sub-working steps associated with the first protocol calling logics.

In some embodiments of the disclosure, a method for determining the first security evaluation factor of the protocol stack is provided, scanning and analyzing the node traversal table according to the protocol trigger sequence rule, and determining the first security evaluation factor of the protocol stack include:
- step 1, a protocol stack abnormal number array is built for the node traversal table, where the protocol stack abnormal number array is set with a plurality of abnormal number intervals connected end to end;
- step 2, the node traversal table scanned and analyzed according to the protocol trigger sequence rule, and where every time a node traversal table failing to conform to the protocol trigger sequence rule appears, a number of abnormal protocol stack is determined once;
- step 3, according to abnormal number interval in the protocol stack abnormal number array of protocol stack abnormal number belonging to in a preset time period, a value is assigned to the first security evaluation factor.

For example, the array of protocol stack abnormality times can be $\{p1, p2, p3, \ldots, pn\}$, where p1 is the first preset protocol stack abnormality times, p2 is the second preset protocol stack abnormality times, p3 is the third preset protocol stack abnormality times, and pn is the nth preset protocol stack abnormality times.

A first safety evaluation factor assignment array $\{L1, L2, L3, \ldots, Ln\}$ is set, where L1 is the first preset first safety evaluation factor value, L2 is the second first safety evaluation factor value, L3 is the third first safety evaluation factor value, and Ln is the nth first safety evaluation factor value.

The abnormal times p0 of the protocol stack is determined in a preset time period.

If $p0 \leq p1$, it is determined that L1 is the assignment value of the first safety evaluation factor.

If $p1 < p0 \leq p2$, it is determined that L2 is the assignment value of the first safety evaluation factor.

If $p2 < p0 \leq p3$, it is determined that L3 is the assignment value of the first safety evaluation factor.

If $pn-1 < p0 \leq pn$, it is determined that Ln is the assignment value of the first safety evaluation factor.

In some embodiments of the disclosure, according to normal operation feature of a system, building a protocol normal application rule for each of the protocols in the protocol analysis directory includes:
- step 1, a system running state log is obtained, and a plurality of system sub-running state feature contained in a normal running process of the system are determined according to the system running state log;
- step 2, according to the sub-running state feature of the system, different protocol calling situations at a same time node are recorded, and different protocol calling situations belonging to a same running state feature of the system are integrated to generate protocol normal calling state groups.

All the protocol normal calling state groups are constructed into the protocol normal application rule.

In some embodiments of the disclosure, a method for determining a second security evaluation factor of each of the protocols is provided. According to the protocol normal application rule, scanning and analyzing the node traversal table, and determining a second security evaluation factor of each of the protocols base on an analysis result include:
- step 1, a first timeline for protocol triggering is built, first labels are set for each of the protocol analysis nodes on the node traversal table on the first timeline, and all first labels belonging to a corresponding node traversal table are constructed as a first label group;
- step 2, time interval between the first labels is judged, it is determined whether the time interval between the first labels conforms to the protocol normal rule, and if the protocol normal rule is conformed, the first labels conforming to time interval inspection elements in the protocol normal rule is determined once;
- step 3, the first label groups corresponding to two node traversal tables adjacent to generation time node are scanned and analyzed, and it is determined whether time interval between same first labels in two first label groups conforms to the protocol normal rule, and if the protocol normal rule is conformed, the first labels meeting frequency inspection elements in the protocol normal rule are determined once;

step 4, if one of the first labels meets both the time interval inspection elements and the frequency inspection elements, the first labels conforming to the protocol normal application rule are determined;

step 5, if the first labels fail to conform to meet the protocol normal application rule, a single protocol abnormality are determined once;

step 6, in a preset time period, according to a number of the single protocol protocol abnormality, a value is assigned to the second security evaluation factor of a single protocol.

In some embodiments of the disclosure, a method for determining a trustworthiness degree of the second security evaluation factor of each of the protocols is provided. Based on the first security evaluation factor of the protocol stack, determining a trustworthiness degree of the second security evaluation factor of each of the protocols includes:

step 1, a first security factor corresponding value array is set, and where the first security factor corresponding value array includes a plurality of first security factor corresponding value intervals of being connected end to end, and each of the first security factor corresponding value intervals corresponds to a trustworthiness degree;

step 2, according to a first security factor corresponding value interval of the first security factor corresponding value belonging to, a trustworthiness degree of the second security factor is determined;

In some embodiments of the disclosure, a method for determining the safety state of the second safety evaluation factor is disclosed. Determining a security state of a corresponding protocol according to the revised second security evaluation factor includes:

according to the revised second security evaluation factor, determining the security state value of the corresponding protocol, and where a expression of the security state value is determined as follows:

$$Y = \frac{bn \cdot a_i \cdot \ln \sum_1^i k_i}{e^t}$$

where, Y is the security state value, bn is a corresponding value of a second security evaluation factor of n-th protocol, $a_i$ is a corresponding value of a first security evaluation factor obtained after the protocol stack conforms to the protocol trigger sequence rule for i consecutive times, $k_i$ is a correction coefficient of the first security evaluation factor for i-th time, and t is a security expression parameter.

It should be understood that as the number of times that the protocol stack continuously conforms to the trigger sequence rules of the protocol increases, it means that the system gets higher and higher security recognition in the process of security evaluation from the whole protocol stack during operation, so the direction of revising the corresponding value of the second security evaluation factor should also become higher. In order to realize the adjustment of the security state value by the staff, the security expression parameters are involved, and the finally obtained safety state value is realized to be controllable. by setting the security expression parameters.

In some embodiments of the disclosure, a security analysis system based on protocol state is provided and includes: a protocol analysis directory input module, a traversal table generation module, a signature module, a protocol stack security evaluation module, a single protocol security evaluation module, and a security state determination module.

A protocol analysis directory input module is used for inputting a protocol analysis directory.

A traversal table generation module is used for generating a node traversal table according to protocol analysis nodes of data passing through.

A signature module is used for signing the node traversal table according to protocol analysis nodes of data passing through.

A protocol stack security evaluation module is internally provided with a protocol trigger sequence rule, and used for scanning and analyzing the node traversal table to determine a first security evaluation factor of the protocol stack.

A single protocol security evaluation module is internally provided with a protocol normal application rule, and used for scanning and analyzing the node traversal table to determine a second security evaluation factor of each of the protocols.

A security state determination module is used for analyzing the first security evaluation factor of the protocol stack, determining a trustworthiness degree of the second security evaluation factor based on a analysis result, revising the second security evaluation factor according to the trustworthiness degree, and determining a security state of a corresponding one of protocols according to a revised second security evaluation factor.

The signature module is arranged in equipment of a corresponding protocol analysis node.

The disclosure provides a security analysis method and system based on protocol state, which includes the following: a node traversal table is built, the node traversal table is scanned and analyzed according to the protocol trigger sequence rule, a first security evaluation factor of a protocol stack is determined, and a second security evaluation factor of each protocol is determined based on protocol normal application rule, and the trustworthiness degree of the second security factor is determined based on the first security factor, and the second security factor is revised based on the trustworthiness degree, and the security state of the protocol is determined according to the revised second security factor, thus the analysis of the protocol state is realized, and the security of the protocol can be accurately determined.

Finally, it should be noted that the above embodiments are only used to illustrate the technical scheme of the disclosure, but not to limit it. Although the disclosure has been described in detail with reference to the preferred embodiments, ordinary skilled in the field should understand that they can still modify or replace the technical scheme of the disclosure, and these modifications or equivalent substitutions cannot make the modified technical scheme deviate from the spirit and scope of the technical scheme of the disclosure.

What is claimed is:

1. A security analysis method based on protocol state, comprising:

building a protocol analysis directory, and building protocol analysis nodes for determining equipment of protocols to be monitored being located according to the protocol analysis directory;

according to a call relationship between the protocols, building a protocol trigger sequence rule;

performing analysis for sent data, determining protocol analysis nodes of data needing to pass through, generating a node traversal table, and signing a corresponding node identification of the node traversal table when data passes through one of the protocol analysis nodes every time;

according to the protocol trigger sequence rule, scanning and analyzing the node traversal table, and determining a first security evaluation factor of a protocol stack;

according to normal operation feature of a system, building a protocol normal application rule for each of the protocols in the protocol analysis directory;

according to the protocol normal application rule, scanning and analyzing the node traversal table, and determining a second security evaluation factor of each of the protocols base on an analysis result;

based on the first security evaluation factor of the protocol stack, determining a trustworthiness degree of the second security evaluation factor of each of the protocols, revising the second security evaluation factor according to the trustworthiness degree, and determining a security state of a corresponding protocol according to a revised second security evaluation factor;

wherein based on the first security evaluation factor of the protocol stack, determining a trustworthiness degree of the second security evaluation factor of each of the protocols comprises:

setting a first security factor corresponding value array, and wherein the first security factor corresponding value array comprises a plurality of first security factor corresponding value intervals of being connected end to end, and each of the first security factor corresponding value intervals corresponds to a trustworthiness degree;

according to a first security factor corresponding value interval of the first security factor corresponding value belonging to, determining a trustworthiness degree of the second security factor;

wherein determining a security state of a corresponding protocol according to the revised second security evaluation factor comprises:

according to the revised second security evaluation factor, determining the security state value of the corresponding protocol, and wherein a expression of the security state value is determined as follows:

$$Y = \frac{bn \cdot a_i \cdot \ln \sum_1^i k_i}{e^t}$$

wherein, Y is the security state value, bn is a corresponding value of a second security evaluation factor of n-th protocol, $a_i$ is a corresponding value of a first security evaluation factor obtained after the protocol stack conforms to the protocol trigger sequence rule for i consecutive times, $k_i$ is a correction coefficient of the first security evaluation factor for i-th time, and t is a security expression parameter.

2. The security analysis method based on protocol state according to claim 1, wherein building protocol analysis nodes for determining equipment of protocols to be monitored being located according to the protocol analysis directory comprises:

according to the protocol analysis directory, determining protocols to be monitored, equipment of the protocols being located and function of the protocols;

building the protocol analysis nodes according to the equipment of the protocols being located, and building a protocol monitoring model at the protocol analysis nodes according to the function of the protocols, wherein the protocol monitoring model is used for monitoring actions of the protocols when executing function.

3. The security analysis method based on protocol state according to claim 1, wherein according to a call relationship between the protocols, building a protocol trigger sequence rule comprises:

according to function to be executed by the system, determining all sub-working steps of each function needing to complete;

determining a protocol to be applied for all the sub-working steps, determining the protocol to be applied and a protocol calling sequence according to completion feature of completing the sub-working steps, and generating first protocol calling logics, wherein the sub-working steps are associated with the first protocol calling logics;

comparing and analyzing protocols needing to be monitored determined by the protocol analysis directory with all the first protocol calling logics, screening out contained protocols to be monitored for each of the first protocol calling logics, and generating second protocol calling logics according to a calling sequence of corresponding first protocol calling logics for screened protocols needing to be monitored;

constructing all the second protocol calling logics as a protocol trigger sequence rule, and the second protocol calling logics are associated with corresponding sub-working steps associated with the first protocol calling logics.

4. The security analysis method based on protocol state according to claim 1, wherein scanning and analyzing the node traversal table according to the protocol trigger sequence rule, and determining the first security evaluation factor of the protocol stack comprises:

building a protocol stack abnormal number array for the node traversal table, wherein the protocol stack abnormal number array is set with a plurality of abnormal number intervals connected end to end;

scanning and analyzing the node traversal table according to the protocol trigger sequence rule, and wherein every time a node traversal table failing to conform to the protocol trigger sequence rule appears, determining a number of abnormal protocol stack once, according to abnormal number interval in the protocol stack abnormal number array of protocol stack abnormal number belonging to in a preset time period, assigning a value to the first security evaluation factor.

5. The security analysis method based on protocol state according to claim 1, wherein according to normal operation feature of a system, building a protocol normal application rule for each of the protocols in the protocol analysis directory comprises:

obtaining a system running state log, and determining a plurality of system sub-running state feature contained in a normal running process of the system according to the system running state log;

according to the sub-running state feature of the system, recording different protocol calling situations at a same time node, and integrating different protocol calling situations belonging to a same running state feature of the system to generate protocol normal calling state groups;

constructing all the protocol normal calling state groups into the protocol normal application rule.

6. The security analysis method based on protocol state according to claim 5, wherein according to the protocol normal application rule, scanning and analyzing the node traversal table, and determining a second security evaluation factor of each of the protocols base on an analysis result comprise:

building a first timeline for protocol triggering, setting first labels for each of the protocol analysis nodes on the node traversal table on the first timeline, and constructing all first labels belonging to a corresponding node traversal table as first label groups;

judging time interval between the first labels, determining whether time interval between the first labels conforms to the protocol normal rule, and if the protocol normal rule is conformed, determining the first labels conforming to time interval inspection elements in the protocol normal rule once;

scanning and analyzing the first label groups corresponding to two node traversal tables adjacent to generation time node, and determining whether time interval between same first labels in two first label groups conforms to the protocol normal rule, and if the protocol normal rule is conformed, determining the first labels meeting frequency inspection elements in the protocol normal rule once;

if one of the first labels meets both the time interval inspection elements and the frequency inspection elements, determining the first labels conforming to the protocol normal application rule;

if the first labels fail to conform to meet the protocol normal application rule, determining a single protocol abnormality once;

in a preset time period, according to a number of the single protocol protocol abnormality, assigning a value to the second security evaluation factor of a single protocol.

\* \* \* \* \*